(12) United States Patent
Hwang

(10) Patent No.: US 7,952,468 B2
(45) Date of Patent: May 31, 2011

(54) METHOD FOR ORIGINATING CALL

(75) Inventor: Yong-Duk Hwang, Deagu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 556 days.

(21) Appl. No.: 11/346,190

(22) Filed: Feb. 3, 2006

(65) Prior Publication Data

US 2007/0040656 A1 Feb. 22, 2007

(30) Foreign Application Priority Data

Aug. 22, 2005 (KR) ........................ 10-2005-0076854

(51) Int. Cl.
G07C 11/00 (2006.01)

(52) U.S. Cl. ................ 340/286.06; 455/403; 455/422.1; 379/167.01; 379/201.02; 379/201.04

(58) Field of Classification Search ............. 340/286.06; 455/403, 422.1; 379/167.01, 201.02, 201.04
See application file for complete search history.

(56) References Cited

U.S. PATENT DOCUMENTS

| | | | | |
|---|---|---|---|---|
| 5,940,488 A * | 8/1999 | DeGrazia et al. | ........... | 379/93.23 |
| 6,622,082 B1 * | 9/2003 | Schmidt et al. | ................ | 701/117 |
| 6,781,575 B1 * | 8/2004 | Hawkins et al. | .............. | 345/173 |
| 6,782,430 B1 * | 8/2004 | Cragun | .......................... | 709/245 |
| 6,853,911 B1 | 2/2005 | Sakarya | | |
| 7,054,423 B2 * | 5/2006 | Nebiker et al. | .......... | 379/201.01 |
| 7,278,093 B2 * | 10/2007 | Jablonski et al. | ............. | 715/205 |
| 2004/0085970 A1 * | 5/2004 | Kang | .............................. | 370/400 |
| 2004/0119755 A1 * | 6/2004 | Guibourge | .................... | 345/827 |
| 2005/0075097 A1 | 4/2005 | Lehikoinen et al. | | |
| 2005/0144251 A1 * | 6/2005 | Slate | ............................. | 709/215 |
| 2006/0111160 A1 * | 5/2006 | Lin et al. | ..................... | 455/575.3 |
| 2006/0190542 A1 * | 8/2006 | Rhoades | ....................... | 709/206 |
| 2006/0221059 A1 * | 10/2006 | Choi et al. | ..................... | 345/169 |
| 2007/0135136 A1 * | 6/2007 | Ische | .......................... | 455/456.1 |

FOREIGN PATENT DOCUMENTS

| | | |
|---|---|---|
| CN | 1303063 A | 11/2001 |
| CN | 1378762 | 6/2002 |
| CN | 1508718 A | 6/2004 |
| DE | 199 59 647 | 7/2000 |
| EP | 1 294 163 | 3/2003 |
| EP | 1 431 896 A1 | 5/2003 |
| GB | 2346769 A * | 8/2000 |
| JP | 2002016688 * | 6/2000 |
| KR | 10-2005-0028930 | 3/2004 |

* cited by examiner

*Primary Examiner* — Travis R Hunnings
(74) *Attorney, Agent, or Firm* — Roylance, Abrams, Berdo and Goodman L.L.P.

(57) ABSTRACT

Disclosed is a method for originating a call. The method for originating the call enables a user to conveniently originate a call to a phone number and a web address input from the user. To this end, the method includes the steps of displaying an image and information corresponding to the image, determining if a key allowing connection to one of a phone number and a web address included in the information is input, and connecting to one of the phone number and the web address if it is determined that the key is input.

8 Claims, 4 Drawing Sheets

METHOD FOR ORIGINATING CALL

This application claims the benefit under 35 U.S.C. §119 (a) of a Korean Patent Application entitled "Method for Originating Call", filed in the Korean Intellectual Property Office on Aug. 22, 2005, and assigned Ser. No. 2005-76854, the entire contents of which are hereby incorporated by reference.

BACKGROUND OF THE INVENTION

1. Field of the Invention

The present invention relates to a portable terminal, and more particularly to a method for originating a call in a portable terminal.

2. Description of the Related Art

Recently, as portable terminals have become popular, portable terminals including various functions have been increasingly provided. In addition, users can employ portable terminals for representing their characteristics by storing personal information and various data in the portable terminals. For example, even if data including place information stored by a user comprises a phone number for the place or a web address including additional information, the user must change a mode of a portable terminal to a communication mode in order to originate a call to the phone number. In addition, the user must execute the menu of a wireless Internet allowing connection to an additional web address or use additional media in order to obtain additional information besides the previously stored place information. In a method for originating a call or connecting to a web address in order to obtain additional information as well as information stored in a portable terminal, the portable terminal must change the mode thereof to a call terminating/originating mode, or perform a wireless Internet mode.

SUMMARY OF THE INVENTION

Accordingly, the present invention has been made to address the above-mentioned problems, and an object of the present invention is to provide a method for originating a call in a portable terminal, which enables a user to conveniently originate a call to a phone number and a web address input from the user.

Another object of the present invention is to provide a method for originating a call in a portable terminal, which makes it easier to determine information included in an image.

To accomplish the above objects, a method for originating a call in a portable terminal is provided. The method comprises displaying an image and information corresponding to the image, determining if a key for allowing connection to one of a phone number and a web address included in the information is input, and connecting to one of the phone number and the web address if it is determined that the key is input.

BRIEF DESCRIPTION OF THE DRAWINGS

The above and other objects, features and advantages of the present invention will be more apparent from the following detailed description taken in conjunction with the accompanying drawings, in which.

Throughout the drawings, like reference numerals will be understood to refer to like parts, components and structures.

DETAILED DESCRIPTION OF EXEMPLARY EMBODIMENTS

Hereinafter, exemplary embodiments of the present invention will be described in detail with reference to the accompanying drawings In the following description of exemplary embodiments of the present invention, a detailed description of known functions and configurations incorporated herein will be omitted for clarity and conciseness. According to an exemplary embodiment of the present invention, contents including images and texts corresponding to the images are defined as directories, and a list having the directories by grouping the directories is defined as "blog".

Figure 1:
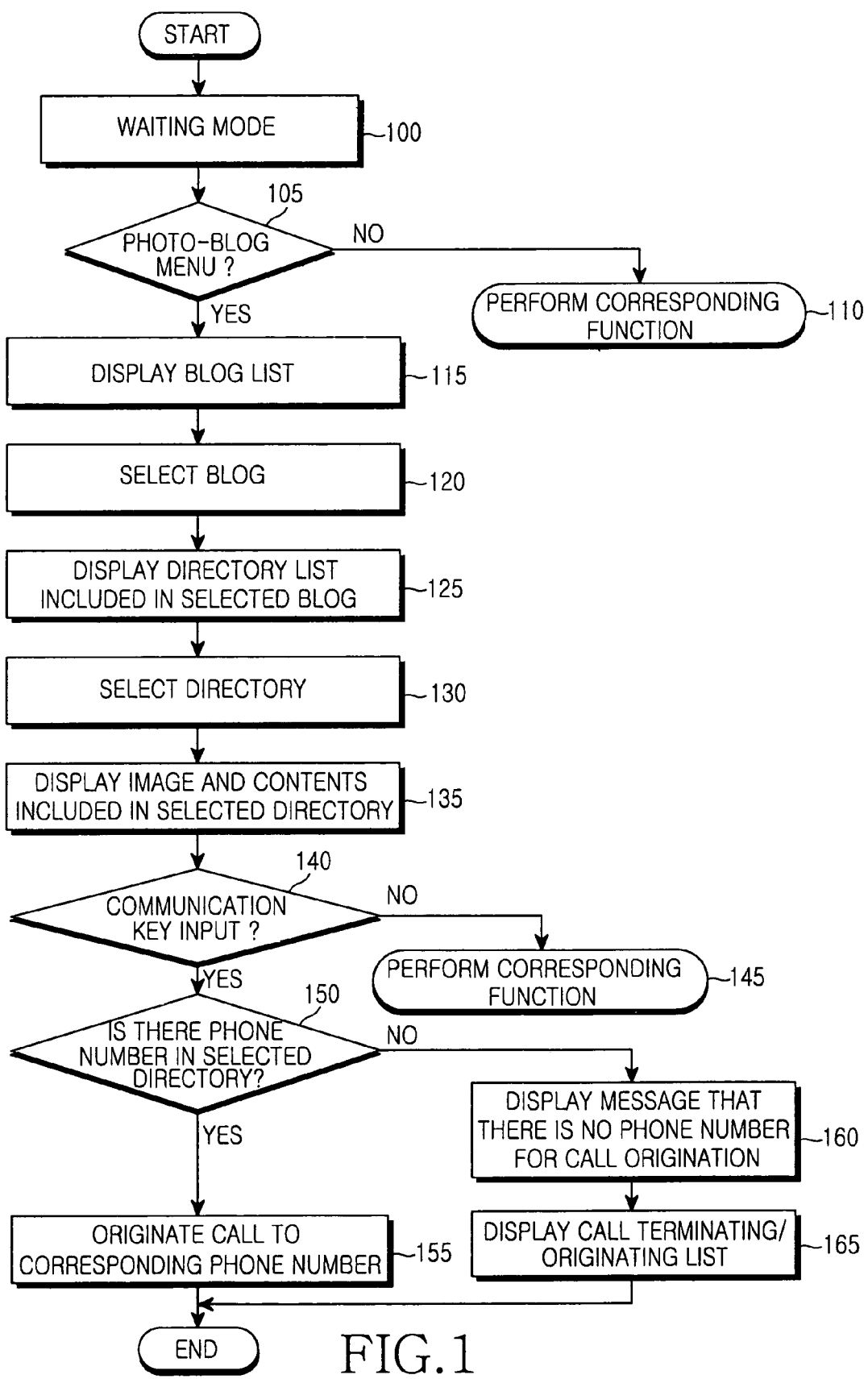
FIG. 1 is a flowchart illustrating an operation of originating a call in a portable terminal according to an exemplary embodiment of the present invention.
Figure 2A:
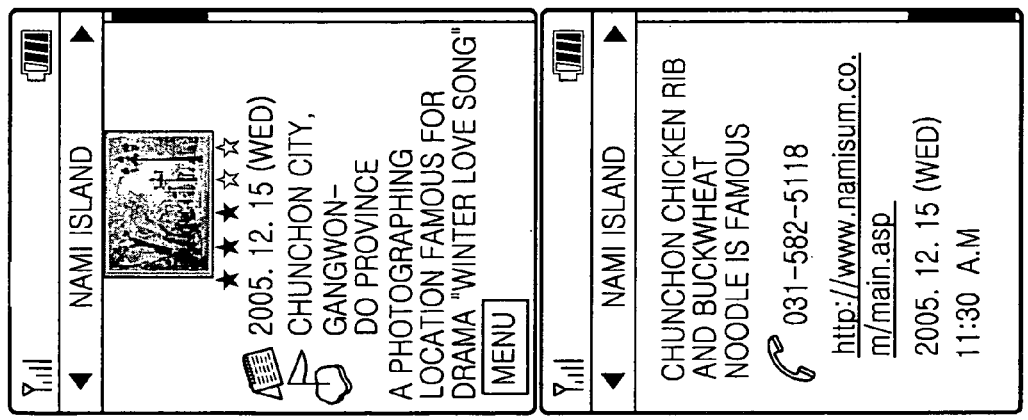
FIGS. 2A, 2B and 2C are displays illustrating a screen image displayed when a call is originated in the portable terminal according to an exemplary embodiment of the present invention.
Figure 2B:
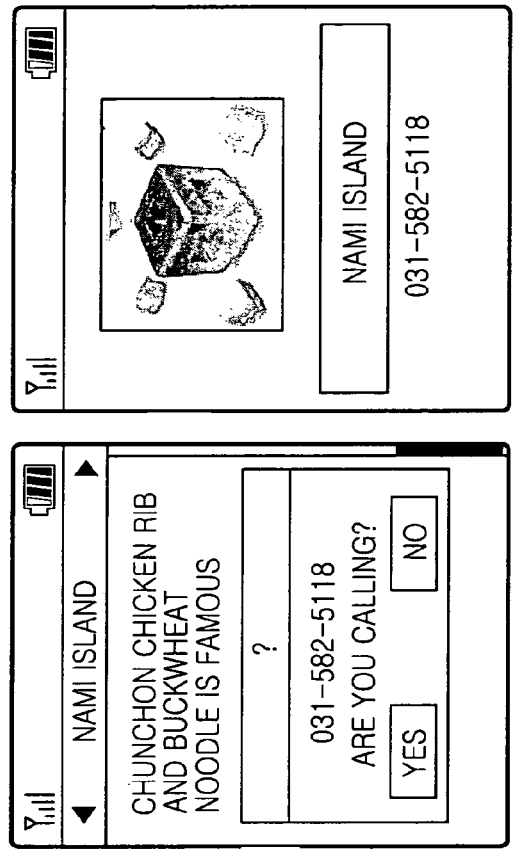
Figure 2C:
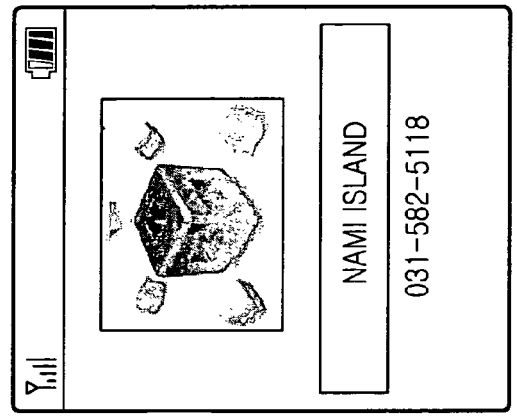

FIG. 1 is a flowchart illustrating an operation of originating a call in a portable terminal according to an exemplary embodiment of the present invention. FIGS. 2A, 2B and 2C are displays illustrating a screen image displayed when a call is originated in the portable terminal according to an exemplary embodiment of the present invention. A controller (not shown) of the portable terminal has a waiting mode in step 100. If the controller is determined that a key input signal is generated from a user in the waiting mode, the controller determines if the key input signal allows the execution of a menu of "photo-blog" among a variety of functions of the portable terminal in step 105. If the controller determines that the key input signal does not allow the execution of the photo-blog menu, the controller executes a function corresponding to the key input signal in step 110. In addition, if the controller determines that the input key signal allows the execution of the photo-blog menu in step 105, the controller controls the previously stored photo-blog list so as to be displayed in step 115.

The controller perform step 120 so as to receive one blog selected from a user in the displayed blog list. Thereafter, the controller displays a list of directories included in the selected blog in step 125. The controller receives one of the directories displayed in step 125 from the user in step 130. Thereafter, the controller displays an image in the selected directory and contents which are previously received from the user, corresponding to the image as shown in FIG. 2A. If the controller determines that it has received a predetermined input signal from a user while displaying an image corresponding to the selected directory and contents corresponding to the image, the controller determines if the input key signal is a communication key signal for making communication in step 140. If the controller determines that the input key signal is not a communication signal, the controller performs a function corresponding to the input key signal in step 145. In addition, if the controller determines that the input key signal is the communication key signal, the controller performs step 150 so as to determine if there is a phone number in the image and the contents corresponding to the image displayed in step 135. If the controller determines that there is a phone number in the displayed contents, the controller displays a message for determining if it will originate a call to the phone number as shown in FIG. 2B. Thereafter, the controller originates a call to the phone number according to the selection of the user for the displayed message in step 155 and displays an image of the originated call on a display module as shown in FIG. 2C. Information about a receiver displayed when the call is originated comprises a phone number of the call receiver and the name of the receiver. The name of the receiver may be set as the title of the displayed contents, or the title of the displayed image. In addition, if the controller determines that there is no phone number included in the selected directory in step 150, the controller displays in step 160 a message reporting that there is no call information to be originated because there is no phone number included in the directory. Then, the controller displays call terminating/originating lists stored in the memory module in step 165.

Figure 3:
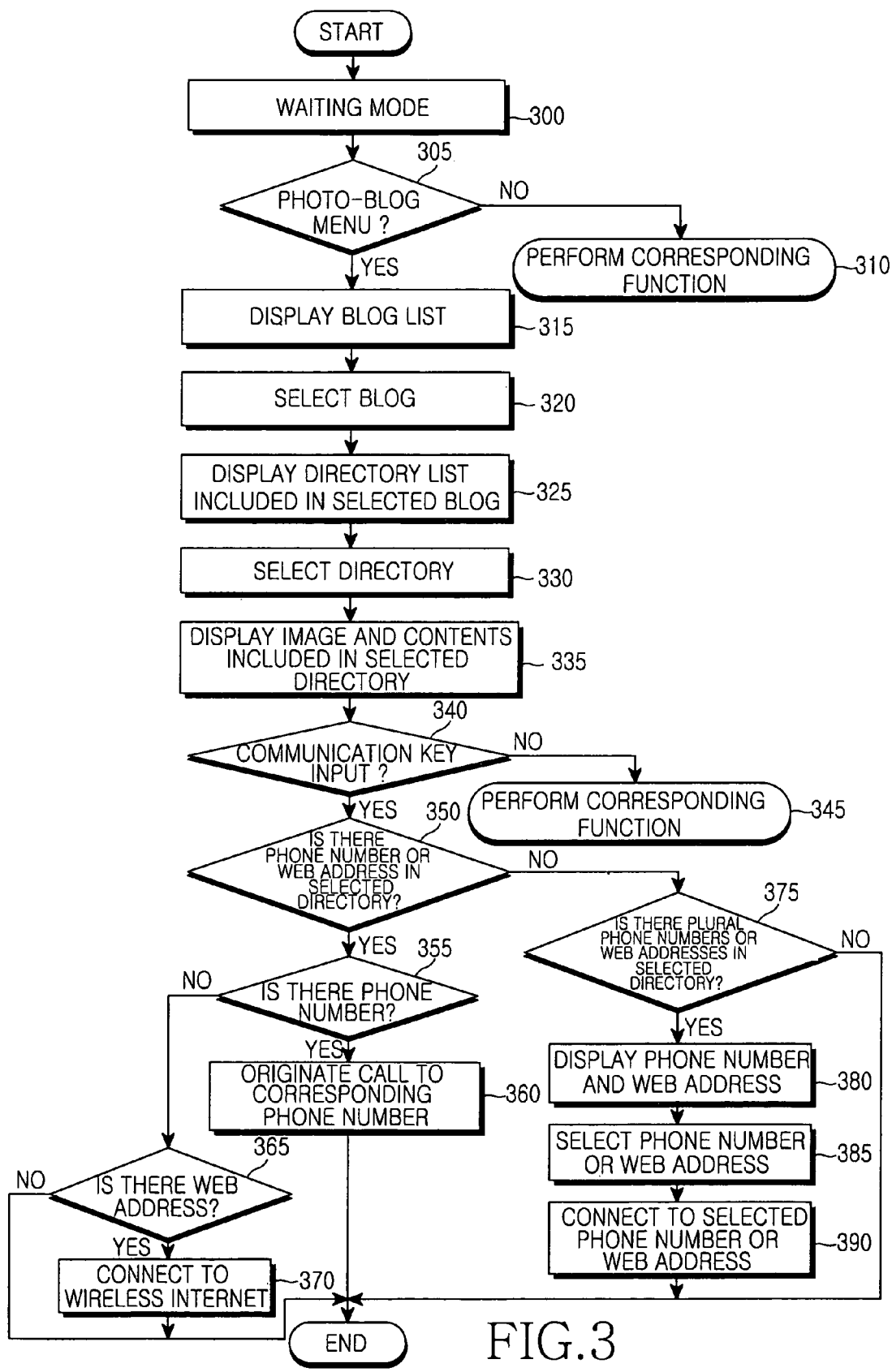
FIG. 3 is a flowchart illustrating an operation of originating a call in a portable terminal according to an exemplary embodiment of the present invention.

FIG. 3 is a flowchart illustrating an operation of originating a call in a portable terminal according to an exemplary embodiment of the present invention. The controller has a waiting mode in step 300. When the controller determines a key input signal in the waiting mode, the controller determines if the key input signal allows the execution of a photo-blog menu in step 305. The controller performs a function corresponding to the input key signal in step 310, or displays a list included in the photo-blog in step 315 according to the determination result. After step 315, the controller displays a list of directories included in the photo-blog through the operation similar to that of the previous embodiment shown in FIG. 1 and displays an image included in a predetermined directory selected from a user in the list of the directories and contents, which are previously received from the user, corresponding to the image in step 320 through 335.

If the controller determines that it receives a predetermined key input signal from a user when an image and the contents corresponding to the image are displayed in step 335, the controller determines if the input key signal allows communication in step 340. The controller performs a function corresponding to the input key signal according to the determination result in step 345, or determines if there is a phone number or a web address in the image and the contents corresponding to the image, which are displayed in step 335, in step 350. If the controller determines that there is a phone number or a web address in the contents corresponding to the image according to the determination result, the controller determines if the existing information is a phone number in step 355. If the controller determines that the existing information included in the contents corresponding to the displayed image is a phone number, the controller originates a call to the phone number in step 360. If the controller determines that the existing information included in the contents is not a phone number in step 355, the controller determines if the included information is a web address in step 365. Thereafter, if the included information corresponds to the web address, the controller connects to the web address by connecting to a wireless Internet in step 370.

In step 375, the controller determines if there are a plurality of phone numbers or web addresses existing in the image of the selected directory and contents corresponding to the image according to the determination result of step 350. If the controller determines that there are both a phone number and a web address in the contents, or if the controller determines that there are a plurality of phone numbers, or web addresses, the controller performs step 380 so as to display a list of phone numbers or web addresses included in the contents. Thereafter, the controller performs step 385 so as to receive one of the displayed phone number and the displayed web address from a user. Then, the controller performs step 390 so as to originate a call to the phone number selected from the user, or connect to the selected web address by accessing a wireless Internet.

Figure 4:
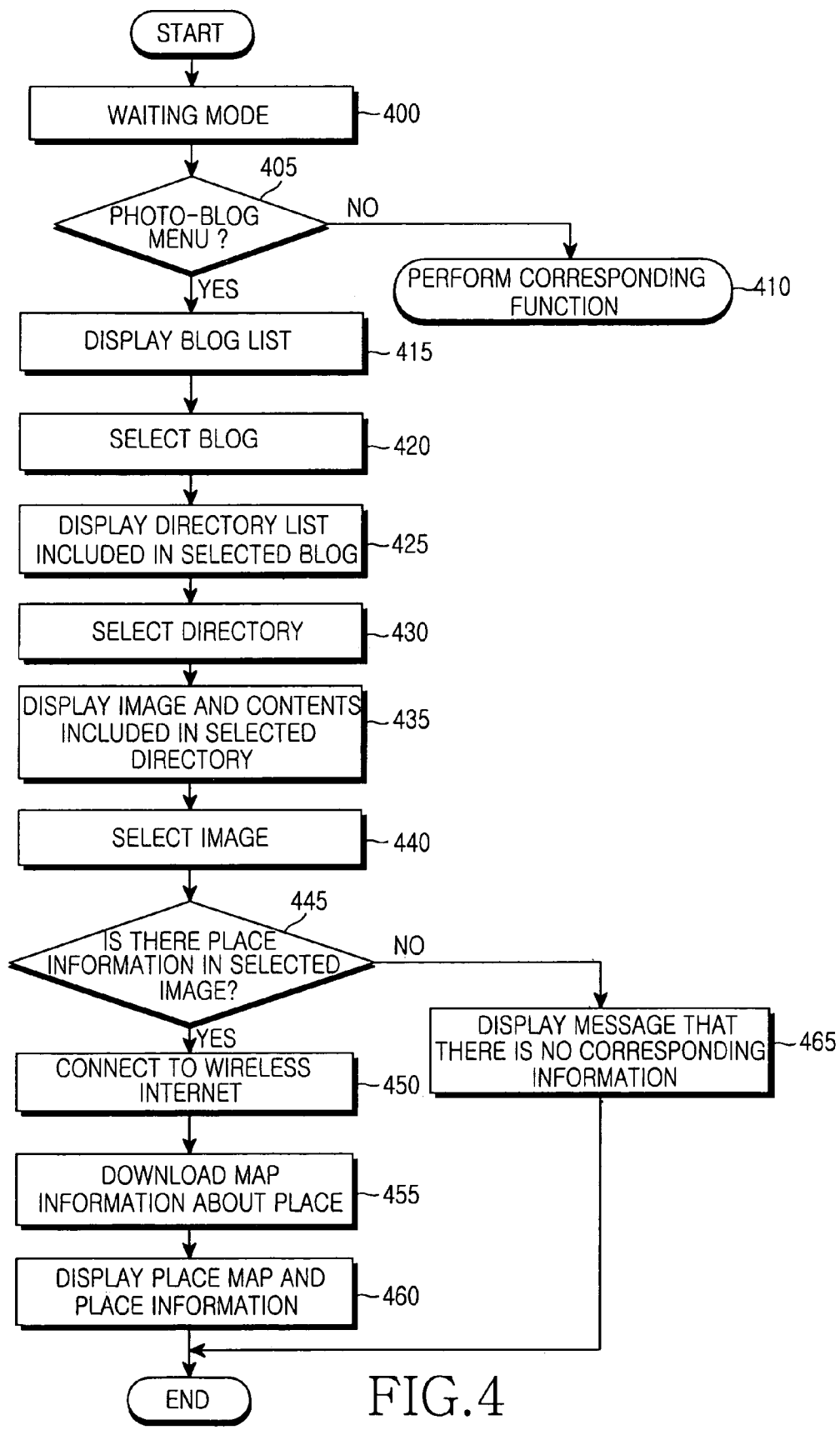
FIG. 4 is a flowchart illustrating an operation of originating a call in a portable terminal according to an exemplary embodiment of the present invention.

FIG. 4 is a flowchart illustrating an operation of originating a call in a portable terminal according to still an exemplary embodiment of the present invention. The controller performs steps 400 through 435 so as to receive a photo-blog menu in a waiting mode, receive one selected from directories included in received photo-blog menu, and display an image included in the selected directory and contents corresponding to the image through an operation similar to operations according to exemplary embodiments shown in FIGS. 2 and 3. The controller receives a selected image included in the displayed and selected directory in step 440. Thereafter, the controller determines if there is place information in the selected image in step 445. The controller checks the place information by determining if place information or a place name is included in the contents corresponding to the image, which is set by the user, or if the title of the image is the name of the place. Accordingly, if the controller determines that there is no place information for the selected image, the controller displays a message reporting that there is no place information in the image in step 465.

If the controller determines that there is place information in the selected image according to the determination result in step 445, the controller performs step 450 so as to connect to a wireless Internet through a radio processing part. If it is determined that connection to the wireless Internet is achieved, the controller downloads map information corresponding to the place for the image in step 455 by specifying the place information as a search word. Although the map information is downloaded in step 455, traffic information and information in addition to the map information may be included in the detailed information about the place. Thereafter, the controller performs step 460 so as to display the downloaded information and the map on the display module. In addition, the downloaded information may be stored in the memory module according to the setting of the user.

While the invention has been shown and described with reference to certain preferred embodiments thereof, it will be understood by those skilled in the art that various changes in form and details may be made therein without departing from the spirit and scope of the invention. Consequently, the scope of the invention should not be limited to the exemplary embodiments, but should be defined by the appended claims and equivalents thereof.

What is claimed is:

1. A method for originating a call in a portable terminal, the method comprising:

displaying an image and information corresponding to the image, wherein the information includes a plurality of phone numbers and/or a plurality of web addresses;

providing a key for allowing connection to one of the plurality of phone numbers and the plurality of web addresses included in the information;

determining whether the plurality of phone numbers or the plurality of web addresses included in the information exist if the key is input;

creating and displaying a list of the plurality of phone numbers or the plurality of web addresses if the plurality of phone numbers and the plurality of web addresses included in the information exist; and connecting to a phone number or a web address displayed on an uppermost of the list of the plurality of phone numbers or the plurality of web addresses if the plurality of phone numbers or the plurality of web addresses included in the information exist;

wherein the call is connected to the phone number displayed on the uppermost of the list if one of the plurality of phone numbers and the plurality of web addresses is not selected by the user after the list is displayed.

2. The method as claimed in claim 1, further comprising:
determining if one of the plurality of phone numbers and the plurality of web addresses is selected by a user from the displayed list; and
connecting to the selected phone number or the selected web address according to the determination result.

3. The method as claimed in claim 1, further comprising displaying a photo-blog menu.

4. The method as claimed in claim 1, further comprising:
(a) determining if the displayed image is selected by a user when the image and contents corresponding to the image are displayed;
(b) determining if the selected image is an image relating to a place; and
(c) displaying a place information corresponding to the image if it is determined that the image relates to the place.

5. The method as claimed in claim 4, wherein the place information relates to a geographical location and comprises at least one of map information, address information, and traffic information.

6. A method for originating a call in a portable terminal, the method comprising:
displaying an image and information corresponding to the image, wherein the information includes a phone number and/or a web address;
providing a key for allowing connection to one of the phone number and the web address included in the information;
determining if the key is input by a user;
displaying a list of a corresponding one of the phone number or the web address if it is determined that the key was input by the user, the list including a map when the image corresponds to a geographical location;
receiving the phone number or the web address selected by the user from the displayed list;
connecting to the selected one of the phone number or the selected web address; and
displaying a message reporting that there is no place information if the image does not relate to a geographical location.

7. A method for originating a call in a portable terminal, the method comprising:
displaying an image and information corresponding to the image;
determining if the displayed image is selected by a user;
determining if the displayed image relates to a geographical place when the displayed image is selected;
downloading a place information corresponding to the displayed image if it is determined that the displayed image relates to the place, wherein the place information includes a map;
displaying the place information corresponding to the image;
connecting to a phone number or a web address associated with the displayed image that was selected; and
displaying a message reporting that there is no place information if the image does not relate to the place.

8. The method as claimed in claim 7, wherein the place information further comprises traffic information.

\* \* \* \* \*